US009573857B2

(12) United States Patent
Reid et al.

(10) Patent No.: US 9,573,857 B2
(45) Date of Patent: Feb. 21, 2017

(54) COMPOSITIONS HAVING ALUMINUM PARTICLES DISPERSED IN A CONTINUOUS PHASE

(71) Applicant: University of Central Florida Research Foundation, Inc., Orlando, FL (US)

(72) Inventors: David L. Reid, Orlando, FL (US); Sudipta Seal, Orlando, FL (US); Eric Petersen, College Station, TX (US)

(73) Assignees: University of Central Florida Research Foundation, Inc., Orlando, FL (US); The Texas A&M University System, College Station, TX (US)

( * ) Notice: Subject to any disclaimer, the term of this patent is extended or adjusted under 35 U.S.C. 154(b) by 303 days.

(21) Appl. No.: 13/797,044

(22) Filed: Mar. 12, 2013

(65) Prior Publication Data

US 2014/0090756 A1    Apr. 3, 2014

Related U.S. Application Data

(60) Provisional application No. 61/609,463, filed on Mar. 12, 2012.

(51) Int. Cl.
  C06B 27/00    (2006.01)
  C06B 33/00    (2006.01)
  (Continued)

(52) U.S. Cl.
  CPC ............ C06B 45/08 (2013.01); B22F 1/0022 (2013.01); B22F 1/0062 (2013.01); B82Y 30/00 (2013.01);
  (Continued)

(58) Field of Classification Search
  CPC ............ C06B 27/00; C06B 33/00; C06B 45/02
  See application file for complete search history.

(56) References Cited

U.S. PATENT DOCUMENTS

3,730,792 A   5/1973   Frost et al.
3,926,698 A   12/1975  Cook et al.
(Continued)

FOREIGN PATENT DOCUMENTS

EP      0598115      1/1993

OTHER PUBLICATIONS

Curtis E. Johnson, et al., "Characterization of Nanometer-to-Micron-Sized Aluminum Powders: Size Distribution from Thermogravimetric Analysis", Journal of Propulsion and Power, vol. 23, No. 4, Jul.-Aug. 2007.
(Continued)

Primary Examiner — Aileen B Felton
(74) Attorney, Agent, or Firm — Jetter & Associates, P.A.

(57) ABSTRACT

A method of forming composite materials includes mixing a first metal precursor with a chelating agent to form a first metal-chelate complex. The first metal-chelate complex is added to a polymer binder having terminating hydroxyl groups to form a polymer binder-first metal-chelate. The polymer binder first metal-chelate complex is mixed with an aluminum precursor. The aluminum precursor decomposes forming aluminum nanoparticles dispersed in a continuous phase material having metallic aluminum cores. At least one of the first metal-chelate complex and the first metal is dissolved in the continuous phase. The aluminum nanoparticles can have a passivating coating layer thereon provided by the polymer binder, or can have a passivating coating layer formed by including an epoxide, alcohol, carboxylic acid, or amine in the adding that forms passivating compound(s) which add further protection that can provide
(Continued)

complete protection from oxidation of the metallic aluminum cores by air.

20 Claims, 2 Drawing Sheets

(51) Int. Cl.
- C06B 45/02 (2006.01)
- C06B 45/08 (2006.01)
- C06D 5/00 (2006.01)
- C06B 45/10 (2006.01)
- B22F 1/00 (2006.01)
- B82Y 30/00 (2011.01)

(52) U.S. Cl.
CPC .............. C06B 45/10 (2013.01); C06D 5/00 (2013.01); *B22F 2001/0029* (2013.01)

(56) References Cited

U.S. PATENT DOCUMENTS

| | | | |
|---|---|---|---|
| 4,337,103 | A | 6/1982 | Elrick et al. |
| 4,543,137 | A | 9/1985 | Edamura et al. |
| 6,679,960 | B2 | 1/2004 | Jones |
| 6,692,655 | B1 | 2/2004 | Martins et al. |
| 7,192,649 | B1 | 3/2007 | Jouet et al. |
| 8,114,229 | B1 * | 2/2012 | Petersen et al. ............ 149/2 |
| 2007/0113939 | A1 * | 5/2007 | Chan ............... C06B 25/34 149/19.3 |
| 2010/0263774 | A1 | 10/2010 | Petersen et al. |
| 2011/0030859 | A1 | 2/2011 | Sawka |

OTHER PUBLICATIONS

Shufeng Wang, et al., "Dynamical Effects of the Oxide Layer in Aluminum Nanoenergetic Materials", Propellants, Explosives, Pyrotechnics, vol. 30, No. 2, 2005, Wiley-VCH Verlag GmbH & Co. KGaA, Weinheim.
Philip Karlsson, et al., "Surface modification for aluminum pigment inhibition", Advances in Colloid and Interface Science, 128-130 (2006), pp. 121-134, Elsevier.
A. A. Gromov, et al., "Passivation Films on Particles of Electroexplosion Aluminum Nanopowders: A Review", Russian Journal of Physical Chemistry B, vol. 4, No. 1, 2010, pp. 156-169, Pleiades Publishing Ltd. Original Russian text published in Khimicheskaya Fizika, vol. 29, No. 2, 2010, pp. 77-91.
J. C. Sánchez-López, et al., "Passivation of nanocrystalline Al prepared by the gas phase condensation method: An xray photoelectron spectroscopy study", Journal of Material Research, vol. 13, No. 3, Mar. 1998, Cambridge Journals, Materials Research Society, pp. 703-710.
H. Althues, et al., "Functional inorganic nanofillers for transparent polymers", The Royal Society of Chemistry, Chem. Soc. Rev. 2007, 36, pp. 1454-1465.
Dudi Adi Firmansyah, et al., Microstructural Behavior of the Alumina Shell and Aluminum Core Before and After Melting of Aluminum Nanoparticles, American Chemical Society, The Journal of Physical Chemistry, J. Phys. Chem. C2012, 116, pp. 404-411.
S. A. Iqbal, et al., "Physical Chemistry", Discovery Publishing House, 2005, p. 59, Google books link: https://books.google.com/books?id=ZquSjRU7hPwC&lpg=PP1&pg=PA59#v=onepage&q &f=false.
Oxford English Dictionary http://www.oxforddictionaries.com/us/definition/american_english/dissolve) regarding the chemistry definition of "dissolve".

* cited by examiner

COMPOSITIONS HAVING ALUMINUM PARTICLES DISPERSED IN A CONTINUOUS PHASE

CROSS REFERENCE TO RELATED APPLICATIONS

This application claims the benefit of Provisional Application Ser. No. 61/609,463 entitled "POLYMER COMPOSITE HAVING DISPERSED ALUMINUM PARTICLES", filed Mar. 12, 2012, which is herein incorporated by reference in its entirety.

STATEMENT REGARDING FEDERALLY SPONSORED RESEARCH

The subject invention was made with U.S Government support under Contract No. HQ0147-11-C-6009 with the U.S. Missile Defense Agency. The U.S. Government has certain rights in this invention.

FIELD

Disclosed embodiments relate to composite materials having aluminum particles dispersed in a continuous phase, such as aluminum nanoparticles for propellant and explosive formulations, and methods to form such composite materials.

BACKGROUND

Additives comprising fractions of a percent to several percent of solid propellant mixtures have been considered through the years and are commonly employed in many rocket propellant and explosive compositions. Various additives include burn-rate modifiers (e.g., ferric oxide, metal oxides, and organometallics), curing agents, and plasticizers. In certain cases, additions of small (e.g., <5% by weight) amounts of powdered material to the propellant mixture have been shown to increase or otherwise favorably modify the burn rate. Nanoparticle additives may have an even further influence on the burn rate because of their high surface-to-volume ratios.

Powdered aluminum (metal) is commonly added to solid propellant formulations to increase energy density and specific impulse. Ultrafine or nanoparticulate aluminum has the additional potential to increase burning rates due to its much higher surface-to-volume ratio. However, these materials suffer from difficulties of manufacture, safety hazards, and increasing % aluminum oxide content as the particle size decreases.

Several routes have been developed to produce aluminum nanoparticles, including wire explosion "top-down" methods, and chemical synthesis "bottom-up" methods. Chemical synthesis is advantageous in that no specialized equipment besides standard inert-atmosphere chemical reactors is required, and the bottom-up approach provides the ability to precisely control and tailor the material properties, such as particle size and the passivating oxide layer.

$AlH_3$ (or alane) is a sterically and electronically unsaturated moiety that reacts readily with a wide range of Lewis donors. Amine adducts of alane have emerged as convenient aluminum precursors due to the ability of these compounds to decompose to metallic aluminum in the presence of an organometallic titanium catalyst, including at room temperature. Several studies have investigated the use of different solvents, catalysts, temperatures, and organic/inorganic passivating agents. However, this reaction has proven difficult to control due to the fast reaction kinetics and sensitivity to precise reaction conditions. Additionally, these procedures produce agglomerates of aluminum nanoparticles, which precipitate from solution as powders. Besides being a safety hazard, these aluminum powders are difficult to effectively disperse in the polymer binder of the propellant. The aluminum particle agglomeration reduces the ultimate potential of nano-aluminum to provide large increases in propellant burning rates.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include methods for forming composite materials having dispersed aluminum nanoparticles having metallic aluminum cores in a continuous phase material, such as a polymer or a liquid fuel. A polymer binder-first metal-chelate complex catalyst is used to catalyze decomposition of an aluminum precursor. Such methods overcome the challenge of chemical incompatibility between the polymer and the aluminum precursor (e.g., amine adducts of alane), as well as the catalyst used for the alane decomposition (e.g., titanium tetrachloride or titanium isopropoxide, with polymer binders). For example, polymer binders having terminating hydroxyl (OH) groups, such as hydroxyl-terminated polybutadiene (HTPB), react almost instantly with alane, and are cross-linked by titanium compounds (and other metal compounds) via their terminating hydroxyl groups.

A chelating agent that reacts with the first metal precursor is used to form a first metal-chelate complex. The titanium-chelate complex is then added to a polymer binder, such as HTPB, to form a non-crosslinking coordination complex with the terminal —OH groups of the polymer binder, thereby protecting the polymer from later attack when mixed with the aluminum precursor. The coordination complex acts as a template-like catalyst for the decomposition of the aluminum precursor (e.g., alane adduct) to generate aluminum nanoparticles having a metallic aluminum core and an optional passivating coating layer bound to a surface of the metallic aluminum core. The result is a "one-pot" synthesis, which produces non-agglomerated metallic aluminum nanoparticles dispersed uniformly in a continuous phase, such as the polymer binder or a liquid fuel (for the liquid fuel embodiment the aluminum precursor is synthesized using the liquid fuel as a solvent).

The aluminum nanoparticles generally have a passivating coating layer thereon that can be chemically or physically bound thereto. In one embodiment, the passivating coating layer is provided by the polymer binder. In another embodiment, the passivating coating layer is formed by including optional passivation agent(s) such as an epoxide, alcohol, carboxylic acid, or amine each including at least one carbon in the adding step that results in formation of passivating compound(s), which can add further protection (beyond that provided by the polymer) that can provide complete protection from oxidation of the metallic aluminum cores by air.

Also disclosed are compositions of matter comprising a continuous phase, and metallic aluminum nanoparticles dispersed in the continuous phase having a passivating coating layer chemically or physically bound to an outer surface of a metallic aluminum cores. The passivating coating layer can be provided by a polymer binder when the polymer binder is the continuous phase, or by passivating compound(s) from epoxides, alcohols, carboxylic acids, or amines which add further oxidation protection (beyond the protection provided by a polymer binder passivation coating), that can provide complete protection from oxidation of the metallic aluminum cores by air. The metallic aluminum cores can have an average aluminum oxide thickness≤0.2 nm on their outer surface.

DETAILED DESCRIPTION

Figure 1:
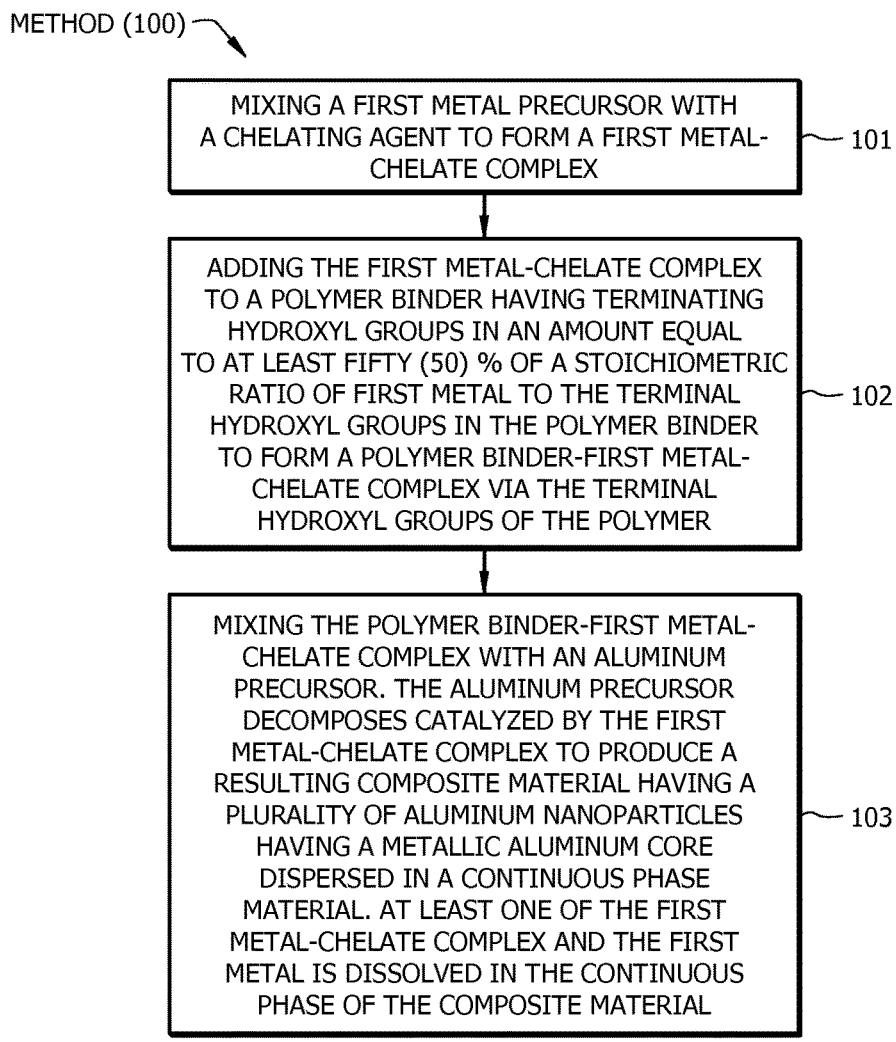
FIG. 1 is a flow chart showing steps for a method of forming composite materials having dispersed aluminum nanoparticles having a metallic aluminum core dispersed in a continuous phase, according to an example embodiment.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

One disclosed embodiment is an in-situ method of synthesizing nano-aluminum particles using a polymer binder-first metal-chelate complex that functions as a catalyst with an aluminum precursor, wherein the aluminum precursor decomposes resulting in formation of a plurality of aluminum nanoparticles dispersed in a continuous phase material. Disclosed methods avoid or at least substantially reduce the problems of aluminum nanoparticle agglomeration, passivation, and safety hazards characteristic of conventional aluminum nanoparticle synthesis methods and the mixing of aluminum nanoparticles into a polymer composite. The handling of aluminum powders presents serious safety hazards because the powders are flammable/explosive. Since disclosed embodiments never involve aluminum powders, the conventional safety hazard associated with flammability/explosiveness can be avoided.

FIG. 1 is a flow chart showing steps for a method 100 of forming a composite material having aluminum nanoparticles comprising metallic aluminum cores dispersed in a continuous phase, such as a polymer or a liquid fuel continuous phase, according to an example embodiment. Step 101 comprises mixing a first metal precursor with a chelating agent to form a first metal-chelate complex. As used herein, the term "chelating agent" is defined as an organic compound which has functionality to complex or sequester metal ions to form stable complexes with a variety of metals. The first metal can comprise titanium, zirconium, other metals such as tin, lead, vanadium, chromium, manganese, cobalt, iron, copper, nickel, as well as and other metals that form similar Lewis-acid complexes.

The first metal precursor can comprise a first metal tetrachloride or alkoxide. In the case the first metal is titanium, the titanium precursor can comprise titanium tetrachloride or a titanium alkoxide. The first metal-based catalyst is first protected by a chelating agent, such as by the bidentate ligand acetylacetonate (ACAC), to form the first metal-chelate complex which functions as a catalyst.

The amount of first metal (which is part of first metal-chelate complex) is generally in the range of 0.01% to 10% on a metal weight % basis in the polymer or liquid fuel, such as a fuel containing 0.01% to 10% titanium if the first metal-chelate complex is titanium based. A lower first metal-chelate complex concentration providing a 0.01% to 2% first metal weight % basis, or in about 0.3% in one specific example, can provide better performance, but the amount of first metal-chelate complex (and thus the amount of first metal) in the composition can be varied depending on the fuel or polymer formulation. The composition is defined herein based on the first metal component only, because the molecular weight of the complex can change significantly depending on what the first metal is bonded to, but the catalytically active site is the first metal itself, so that is the important weight to define.

Step 102 comprises adding the first metal-chelate complex to a polymer binder having terminating hydroxyl groups generally in an amount equal to at least fifty (50)% of a stoichiometric ratio of first metal to the terminal hydroxyl groups in the polymer binder to form a polymer binder-first metal-chelate complex via the terminal hydroxyl groups of the polymer. Accordingly, if the polymer contains 2 hydroxyl groups per molecule, the molar ratio would be at least 1:1 first metal:polymer. Additionally, an excess of first metal is possible. There is generally no upper limit on the amount of first metal. The at least 50% of the stoichiometric ratio corresponds to roughly the minimum amount of first metal-chelate complex needed to protect the polymer from direct reaction with the aluminum precursor.

The polymer binder provides OH functionality, which is typical of known polymer binders for explosive or propellant compositions. For example, the polymer binder can comprise HTPB or polybutadiene acrylonitrile (PBAN). This method will also work with binders having COOH (carboxylic acid) functionality. Example binders with OH or COOH functionality include, but are not limited to, HTPB and PBAN (both disclosed above), polybutadiene acrylic acid (PBAA), carboxyl terminated polybutadiene (CTPB), polyglycidyl nitrate (PGN), glycidyl azide prepolymer (GAP), poly(3,3-bis(azidomethyl) Oxetane) Poly(BAMO), poly(3-azidomethyl 3-methyl oxetane) Poly(AMMO), and poly(3-nitratomethyl methyl oxetane) poly(NIMMO).

Step 102 can further comprise optionally including at least one of an epoxide, alcohol, carboxylic acid, or amine each comprising at least one carbon atom to provide a passivating coating layer. One particular additional passivating molecule that has been found to allow for high aluminum nanoparticle particle concentrations is 1,2-epoxyhexane.

However, it may be advantageous to have formulations without any optional passivating materials, so that the polymer binder functions as the passivation layer. Passivating molecules when included are typically present in a significant amount, generally a 1:5 molar ratio of passivator:aluminum, although this can reduce the overall performance of the propellant by lowering the burning rate and/or the specific impulse. Importantly, it has been found a significant correlation between the amount and molecular weight of the passivating molecule and the viscosity of the uncured binder containing aluminum particles. The presence of passivating molecules bonded to the aluminum nanoparticles, especially large molecules, can significantly increase the polymer viscosity, and this makes the mix far more difficult to process, since the composition is generally cast or extruded and then cured (crosslinked) in a mold to make a solid propellant. This can effectively limit the concentration of aluminum in the binder to a few percent (e.g., maximum 10%) before the viscosity gets too high. By avoiding the use of a passivating agent, a significantly lower viscosity of the uncured binder is provided, allowing a much higher amount of nano-aluminum, such as about double or more.

Step 103 comprises mixing the polymer binder-first metal-chelate complex with an aluminum precursor. The aluminum precursor can comprise an amine adduct of alane. The aluminum precursor decomposes catalyzed by the first metal-chelate complex to produce a plurality of aluminum nanoparticles dispersed in a continuous phase material having a metallic aluminum cores. At least one of the first metal-chelate complex and the first metal is dissolved in the continuous phase.

In embodiments that include optional passivating agent(s), the resulting passivating coating layer is generally physically or chemically bound to the outer surface of the metallic aluminum cores. If an optional passivating compound is added in step 102, the passivating coating layer formed generally results in little or no polymer binder bound (physically or chemically) directly to the aluminum nanoparticles. This embodiment can provide complete protection of the metallic aluminum cores from oxidation by air.

If no optional passivating agent is added in step 102, then it is the polymer binder itself which can be considered to be the passivating layer for the metallic aluminum cores of the aluminum nanoparticles, where the polymer binder can be physically or chemically bound to the metallic aluminum cores. In this embodiment, the polymer binder as the coating layer may not fully protect the metallic aluminum cores of the nanoparticles from oxidation/reaction with air, but will generally provide some protection to limit the thickness of the resulting aluminum oxide layer on the aluminum nanoparticles. However, it may be possible to tailor the structure and composition of the polymer binder or polymer-catalyst complex to provide better passivation and oxidation protection for the metallic aluminum cores from oxidation by air.

The final state of the first metal-chelate complex after the reaction in step 103 can vary. It is possible that, since the aluminum is a strong reducing agent, the first metal-chelate complex catalyst is eventually reduced to the metallic state and no longer present as a Lewis acid complex. However, the catalyst may remain as a first metal-chelate complex dissolved in the continuous phase (polymer or liquid fuel).

The continuous phase can comprise liquid polymer solution. In another embodiment the continuous phase material can comprise a liquid fuel. The liquid fuel can comprise hydrocarbons, other fuels, or liquid monopropellants such as hydrazine, ethylene oxide, and nitromethane can also be used as the liquid continuous phase. For the liquid fuel embodiment, the method further comprises synthesizing the aluminum precursor using the liquid fuel as a solvent before the mixing (step 103).

The order of addition can be significant. By first adding the first metal-chelate complex to the polymer (step 102), and then mixing with the aluminum precursor (step 103), rather than the reverse order, reaction of the aluminum precursor with the hydroxyl groups on the polymer is avoided so that the polymer will not cross-linked/solidify.

The reaction should be conducted under inert atmosphere (i.e., non-oxidizing, e.g. argon or nitrogen), up until at least either the optional passivating agent is added or, if no passivating agent is used, the polymer binder concentration is brought to a level of at least about 1:20 polymer binder:aluminum (molar ratio). After this, the mixture is air stable, and there is no requirement for an inert atmosphere.

Temperature can be used to control the rate of the reaction. In one particular embodiment the adding step is performed at room temperature, and then the solution is rapidly heated solution to the reflux temperature (usually between 70° C. and 120° C., depending on the choice of solvent). However, the addition can also be done with the solution already at the boiling point to increase the reaction rate, or chilled to slow the reaction rate.

There are some steps that can be added to improve the yield. When the aluminum precursor comprises an amine adduct of alane, a byproduct of the reaction is the amine (from the alane complex), which generally has a lower boiling point than the reaction solvent, which can be removed from the reaction as the solution boils, or afterwards by distillation. Also, to ensure that essentially all the aluminum precursor has reacted, additional small amounts of first metal-chelate complex, or first metal-chelate-polymer complex, can be added as the reaction proceeds.

The aluminum nanoparticle size has been found to be controllable, such as to a size between 5 nm and 50 nm, by the aluminum precursor and polymer binder concentration ratios. As described above, the aluminum nanoparticles can be made air-stable, without a measurable aluminum oxide layer on their outer surface, by providing a passivating coating including optional passivating compounds, such as an epoxide, alcohol, carboxylic acid, or amine in the coating layer. As noted above, if optional passivating compound(s) is added in step 102, the passivating coating layer formed results in little or no polymer binder bound (physically or chemically) directly to the aluminum nanoparticles. The lack of any aluminum powder handling in disclosed propellant manufacturing methods makes disclosed methods safe and efficient routes to maximize energy density and burning rate. The residual organotitanium in the binder can also act as a combustion catalyst itself, or can be used as the titanium source for "in-situ" synthesis of $TiO_2$ (titania) nanoparticle catalysts.

In the embodiment with continuous phase is a polymer solution, the aluminum nanoparticles dispersed in the liquid polymer solution may be used to form propellant and explosive formulations, such as by dry mixing, or wet mixing with a liquid fuel and an oxidizer (the liquid polymer being soluble in the liquid (e.g., hydrocarbon) fuel). Moreover, uses may include composite propellants, which contain a mixed-in solid oxidizer, and hybrid propellants, which comprise a solid component (the polymer binder, aluminum nanoparticles, and other additives), and a separate oxidizer such as liquid oxygen.

As notes above, one wet mixing embodiment is a fuel application that provides liquid fuels having in-situ-formed aluminum nanoparticles. Aluminum nanoparticles are promising additives for liquid fuels because of their high energy density and flame temperature. However, one of the most serious challenges impeding their practical use is the difficulty of dispersing and maintaining a well-mixed suspension of aluminum powder in liquid fuels, such as liquid hydrocarbon fuels.

This liquid fuel embodiment addresses this problem by forming the aluminum nanoparticles from chemical precursors synthesized directly in the fuel itself, where the fuel functions in this embodiment as a solvent for forming the aluminum precursor, and with the assistance of a polymer-conjugated catalyst (polymer binder-first metal-chelate complex). The result is a stable suspension of unagglomerated (dispersed) aluminum nanoparticles in the liquid fuel which provides the continuous phase, which can comprise coated aluminum nanoparticles.

The coated aluminum nanoparticles include a metallic aluminum core and a passivating coating layer chemically bound to a surface of the metallic aluminum core, where the passivating coating layer comprises the polymer. This embodiment will simplify the use of aluminum-loaded liquid fuels by eliminating the need to actively mix the fuel to prevent the particles from settling. It will also reduce engine wear and nozzle erosion, improve the fluid flow characteristics and droplet behavior during combustion, and improve the safety of metal-loaded fuel manufacturing by eliminating the handling of reactive nanopowders.

All reactions are generally conducted in a chemically inert atmosphere, such as a nitrogen or argon atmosphere. The aluminum-containing chemical precursor can be a tertiaryamine adduct of alane, e.g. $AlH_3 \cdot NR_3$. This compound can be synthesized directly in the liquid fuel (which acts as a solvent) by methods including either of the one of two methods described below.

Method 1: The simple extraction of alane from lithium aluminum hydride using tertiary amines according to the equation: $3LiAlH_4 + 2NR_3 \rightarrow 2AlH_3 \cdot NR_3 + Li_3AlH_6$ The insoluble $Li_3AlH_6$ byproduct can be removed by simple filtration.

Method 2: A reaction similar to Method 1, but assisted by $AlCl_3$ to give only LiCl as an insoluble byproduct, which also can be removed by filtration: $AlCl_3 + 3LiAlH_4 + 4NR_3 \rightarrow 4AlH_3 \cdot NR_3 + 3LiCl$ The alane-amine adduct dissolved in the fuel can then be decomposed by addition of a first metal (e.g., titanium)-based catalyst to form an aluminum nanoparticle suspension, and the low-boiling-point amine byproduct can be removed by distillation: $AlH_3 \cdot NR_3 \rightarrow Al + 3/2H_2 + NR_3$.

In order to produce a stable, unagglomerated suspension of aluminum nanoparticles, the reaction can be conducted with the use of a polymer-conjugated titanium homogeneous catalyst. This catalyst accelerates the decomposition of $AlH_3 \cdot NR_3$, and also controls the particle nucleation and growth by interacting with the particle surfaces to prevent particle agglomeration and precipitation. The catalyst contains 6 coordinate/octahedral bonding geometry on the titanium center(s), which are bonded via at least one ligand to a polymer or oligomer molecule. In experiments performed, the polymer was HTPB with approximately a 2,000 molecular weight, but other polymers that can bond as ligands to a first metal (e.g., titanium) complex can also be used. In the catalyst structure 200 shown in FIG. 2, each end of the polymer molecule is bonded to an octahedral titanium center.

Figure 2:
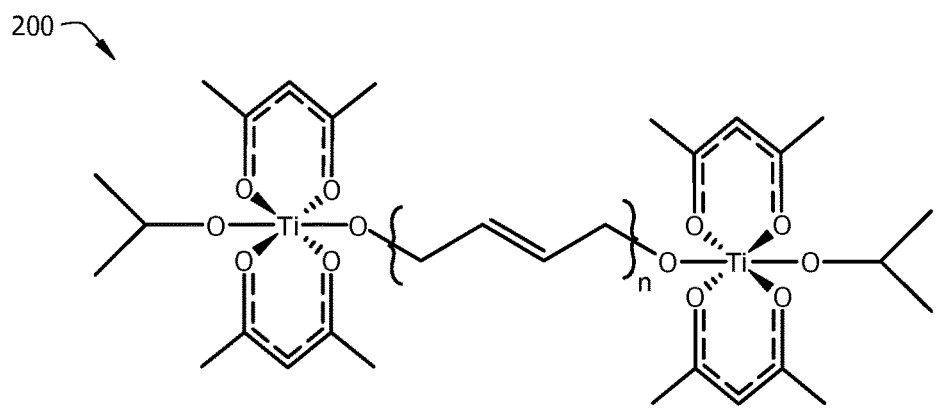
FIG. 2 shows an example catalyst structure where each end of the polymer molecule is bonded to an octahedral titanium center, according to an example embodiment.

The catalyst structure 200 shown in FIG. 2 can be formed by first combining a tetrahedral titanium complex such as titanium tetrachloride or titanium tetraisopropoxide with a strong bidentate ligand such as acetylacetone, followed by mixing this compound with the polymer or oligomer. The liquid fuel can again be used as a solvent for the synthesis of the polymer-conjugated catalyst.

Following separate preparation of the catalyst and the amine-alane, both in the liquid fuel, the two solutions are generally combined at room temperature. Optionally, the reaction can be heated to accelerate the reaction and encourage particle growth. An external optional passivating compound, such as various carboxylic acids, alcohols, or epoxides, can be added during the reaction to help prevent the formation of an oxide layer on the aluminum particles when they are exposed to air.

Figure 3A:
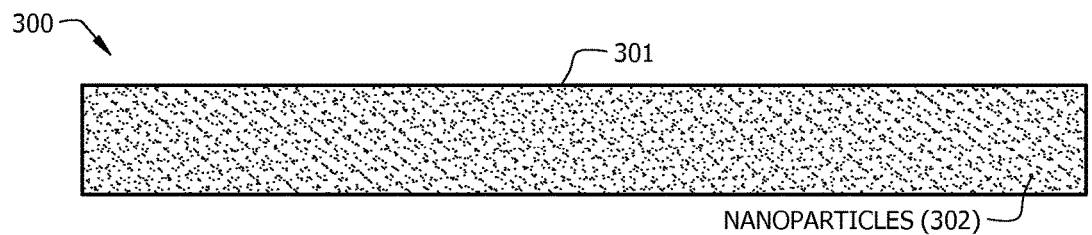
FIG. 3A is a depiction of an example composition of matter comprising a continuous phase having a plurality of aluminum nanoparticles dispersed therein having a passivating coating layer chemically bound to an outer surface of the metallic aluminum core, according to an example embodiment.

Also disclosed are compositions of matter comprising a polymer continuous phase, and aluminum nanoparticles dispersed therein. FIG. 3A is a depiction of a composition of matter 300 comprising a continuous phase 301 having a plurality of coated metallic aluminum nanoparticles 302 therein, such as being 5 nm to 50 nm in size. As described above the continuous phase can be a polymer (e.g., a liquid polymer) and a liquid fuel (e.g., a hydrocarbon fuel). At least one of the first metal-chelate complex and the first metal is dissolved in the continuous phase. The coated nanoparticles 302 include a metallic aluminum core 302a and a passivating coating layer 302b as shown in FIG. 1B comprising the polymer binder used for the synthesis.

One or more optional additional passivating additives as described above can provide a coating layer including passivation compounds (e.g., epoxides, alcohols, carboxylic acids, or amines each comprising at least one carbon atom), which further provides passivation protection (as compared to the passivation provided by the polymer binder) against aluminum oxide formation from oxidation of the surface of the metallic aluminum core 302a, so that the aluminum nanoparticles become air stable so that despite air exposure there is no measurable aluminum oxide layer between the aluminum core 302a and the coating layer 302b. As noted above, if an optional passivating compound is included, the passivating coating layer has little or no polymer binder bound (physically or chemically) directly to the aluminum nanoparticles.

Figure 3B:
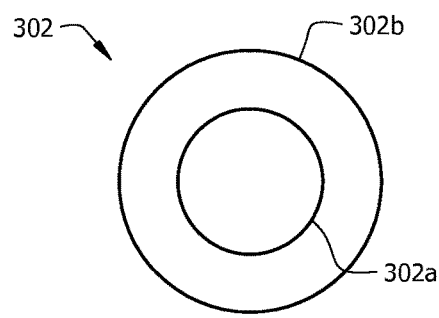
FIG. 3B depicts a disclosed coated aluminum nanoparticle including a metallic aluminum core and a passivating coating layer chemically bound to an outer surface of the metallic aluminum core, according to an example embodiment.

As described above, the organometallic first metal-binder complex can protect the polymer binder (e.g., HTPB) from unintended crosslinking, so that the polymer binder in disclosed compositions will not be measurable crosslinked. Moreover, as described above, when an additional passivating agent is used, the coating layer formed prevents oxidation of the aluminum cores so that there is generally no measurable aluminum oxide layer between the aluminum core 302a and the coating layer 302b. The high level of aluminum nanoparticle 302 dispersion advantageously provides a very small average diffusion distance, such as from 10 nm to 100 nm. The thickness of the coating layer is generally 2 nm to 5 nm. The coated aluminum nanoparticles have an average aluminum oxide thickness≤0.2 nm. The aluminum nanoparticles 302 generally have the roughly spherical shape depicted in FIG. 3B, but can have other shapes.

Disclosed polymer composites having highly dispersed aluminum particles as noted above can be used for propellant and explosive formulations. However, as disclosed above, disclosed polymer composites having highly dispersed aluminum particles can be used to add coated aluminum particles to liquid fuels to add to performance, such as to kerosene. For use in liquid fuels, the amount of polymer to form the polymer solution selected is generally based in slightly more than the minimum amount of polymer to prevent nanoparticle aggregation, such as about 0.3 wt. %.

EXAMPLES

Disclosed embodiments are further illustrated by the following specific Examples, which should not be construed as limiting the scope or content of this Disclosure in any way.

Experiments were performed to confirm disclosed embodiments work whether or not there is the addition of an optional additional passivating agent (e.g. epoxyhexane). If no additional passivating agent is added, then the passivating coating layer includes the polymer binder (e.g., HTPB) itself which helps protects the surface of the aluminum particles from reaction with oxygen, as long as sufficient binder is added. Although not determined experimentally, the minimum amount of binder needed for formation of a passivating coating layer for successful protection of the aluminum nanoparticles is believed to be around 1:20 polymer (e.g., HTPB):aluminum molar ratio, or greater.

It may be helpful to use only a small amount of binder-first metal complex in the initial reaction to decompose the alane and form the plurality of aluminum particles. It has been found that molar ratios of 1:50 or 1:100 HTPB:aluminum work well. That works out to mass ratios of about 1:2 or 1:1 HTPB:aluminum. After the initial reaction is complete and the volatile amine byproduct is boiled/distilled off (and the passivating agent, if used, is added), additional HTPB can be added to increase the total volume and bring the aluminum concentration in the final composite to the desired level.

It was initially suspected that pure HTPB would react with and be cross-linked by aluminum nanoparticles, and so any additional HTPB added would need to have its OH groups protected by complexing with first metal or first metal compound particles (e.g., titanium or $TiO_2$ nanoparticles. However, this does not seem to be the case. Disclosed methods have been found work well whether the additional HTPB or other polymer binder added is in pure form or is complexed with a first metal such as titanium.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method of forming a composite material, comprising:
   mixing a first metal precursor including a first metal with a chelating agent to form a first metal-chelate complex;
   adding said first metal-chelate complex to a polymer binder having terminating hydroxyl groups to form a polymer binder-first metal-chelate complex with said terminating hydroxyl groups, wherein said first metal is other than aluminum, and
   mixing said polymer binder-first metal-chelate complex with an aluminum precursor, wherein said aluminum precursor decomposes resulting in formation of a plurality of aluminum nanoparticles dispersed in a continuous phase material having a metallic aluminum core,
   wherein at least one of first metal-chelate complex and said first metal is dissolved in said continuous phase material.

2. The method of claim 1, wherein said polymer binder comprises hydroxyl-terminated polybutadiene (HTPB), said HTPB providing said continuous phase material.

3. The method of claim 1, wherein said plurality of aluminum nanoparticles have an average aluminum oxide thickness ≤0.2 nm on their outer surface.

4. The method of claim 1, wherein said aluminum precursor comprises an amine adduct of alane.

5. The method of claim 1, wherein said continuous phase material comprises a liquid fuel, further comprising synthesizing said aluminum precursor using said liquid fuel as a solvent before said mixing.

6. The method of claim 1, wherein said first metal comprises titanium, zirconium tin, lead, vanadium, chromium, manganese, cobalt, iron, copper, or nickel.

7. The method of claim 1, wherein said first metal comprises titanium, and wherein said first metal precursor comprises titanium tetrachloride or a titanium alkoxide.

8. The method of claim 1, wherein said chelating agent comprises acetylacetone (ACAC).

9. The method of claim 1, wherein said plurality of aluminum nanoparticles are coated aluminum nanoparticles having a passivating coating layer provided by said polymer binder.

10. The method of claim 1, wherein said plurality of aluminum nanoparticles are coated aluminum nanoparticles having a passivating coating layer, further comprising including at least one of an epoxide, alcohol, carboxylic acid, or amine each comprising at least one carbon atom as a passivating agent in said adding, wherein said passivating coating layer compromises said epoxide, said alcohol, said carboxylic acid, or said amine.

11. The method of claim 1, wherein said adding comprises using amounts of said first metal-chelate complex to said polymer binder to provide at least fifty (50) % of a stoichiometric ratio of said first metal to said terminating hydroxyl groups in said polymer binder.

12. A composition of matter, comprising:
a continuous phase material, and
a plurality of aluminum nanoparticles uniformly dispersed in said continuous phase material, and
at least one of first metal-chelate complex including a first metal other than aluminum, or said first metal, dissolved in said continuous phase material.

13. The composition of matter of claim 12, wherein said continuous phase material comprises hydroxyl-terminated polybutadiene (HTPB).

14. The composition of matter of claim 12, wherein said continuous phase material comprises a liquid fuel.

15. The composition of matter of claim 12, wherein said plurality of aluminum nanoparticles have an average aluminum oxide thickness $\leq 0.2$ nm on their outer surface.

16. The composition of matter of claim 12, wherein said first metal comprises titanium, zirconium tin, lead, vanadium, chromium, manganese, cobalt, iron, copper, or nickel.

17. The composition of matter of claim 16, wherein said first metal comprises titanium.

18. The composition of matter of claim 12, wherein said plurality of aluminum nanoparticles are coated aluminum nanoparticles having a passivating coating layer chemically or physically bound thereon.

19. The composition of matter of claim 18, wherein said continuous phase material is a polymer binder, and wherein said passivating coating layer is provided by said polymer binder.

20. The composition of matter of claim 18, wherein said passivating coating layer comprises at least one of an epoxide, alcohol, carboxylic acid, or amine each comprising at least one carbon atom.

* * * * *

UNITED STATES PATENT AND TRADEMARK OFFICE
CERTIFICATE OF CORRECTION

Page 1 of 1

PATENT NO. : 9,573,857 B2
APPLICATION NO. : 13/797044
DATED : February 21, 2017
INVENTOR(S) : David L. Reid et al.

It is certified that error appears in the above-identified patent and that said Letters Patent is hereby corrected as shown below:

On the Title Page

Please replace the inventors listed item (72) with the following:
--(72) Inventors: David L. Reid, Orlando, FL (US); Sudipta Seal, Orlando, FL (US); Eric Petersen, College Station, TX (US); Tyler W. Allen, College Station, TX (US); Andrew R. Demko, College Station, TX (US)--

Signed and Sealed this
Twenty-sixth Day of September, 2023

Katherine Kelly Vidal
*Director of the United States Patent and Trademark Office*